US012724288B2

(12) United States Patent
Sluka

(10) Patent No.: US 12,724,288 B2
(45) Date of Patent: Sep. 1, 2026

(54) HIGH-RESOLUTION LIGHT-FIELD PROJECTOR

(71) Applicant: CREAL SA, Ecublens VD (CH)

(72) Inventor: Tomas Sluka, Lausanne (CH)

(73) Assignee: CREAL SA, Ecublens VD (CH)

( * ) Notice: Subject to any disclaimer, the term of this patent is extended or adjusted under 35 U.S.C. 154(b) by 492 days.

(21) Appl. No.: 18/036,242

(22) PCT Filed: Nov. 24, 2020

(86) PCT No.: PCT/IB2020/061091
§ 371 (c)(1),
(2) Date: May 10, 2023

(87) PCT Pub. No.: WO2022/112818
PCT Pub. Date: Jun. 2, 2022

(65) Prior Publication Data

US 2023/0418087 A1 Dec. 28, 2023

(51) Int. Cl.
*G02B 30/10* (2020.01)

(52) U.S. Cl.
CPC .................................. *G02B 30/10* (2020.01)

(58) Field of Classification Search
None
See application file for complete search history.

(56) References Cited

U.S. PATENT DOCUMENTS

2002/0159002 A1* 10/2002 Chang .............. G02F 1/133603 349/61
2003/0090597 A1* 5/2003 Katoh ................. H04N 9/3111 348/E9.027
2017/0262054 A1* 9/2017 Lanman ............ G02B 27/0172
2019/0086679 A1* 3/2019 Ratcliff ............... H04N 13/307
2019/0162950 A1* 5/2019 Lapstun .............. H04N 13/243
2020/0393676 A1* 12/2020 Hua ..................... G02B 3/0056
2022/0350219 A1* 11/2022 Danziger .......... G02B 27/0172
2024/0126083 A1* 4/2024 Sluka ................ G02B 27/0172

FOREIGN PATENT DOCUMENTS

CN 104469343 A * 3/2015 .......... H04N 13/305
JP 2010/230984 A 10/2010
WO WO-2015/134740 A1 9/2015
WO WO-2018/165117 A1 9/2018

OTHER PUBLICATIONS

International Search Report and Written Opinion for PCT/IB2020/061091 dated Jul. 23, 2021, 13 pages.

* cited by examiner

*Primary Examiner* — Jyotsna V Dabbi
(74) *Attorney, Agent, or Firm* — BLANK ROME LLP

(57) ABSTRACT

Light-field projector for projecting an image, comprising: a light-field image source (1) comprising an image generating device (20*a*, 20*b*), including a plurality of pixel components (15*a*-15*d*) generating a plurality of modulated light beams (111); an imaging optical element (70) projecting an image of the plurality of modulated light beams (111) to a light-source image plane (34); projection optics (2) configured to project the modulated light beams (111) such as to define an eye-box (121) and to form projector pixel images (16*a*-16*d*); the projection optics (2) further configured to form projector pixel images (16*a*-16*d*) at a projector image plane (115) and projector virtual pixel image (26*a*) at a shifted plane (114). The imaging optical element (70) is configured such that the position of the projector image plane (115) coincides with the position of the shifted plane (114).

15 Claims, 6 Drawing Sheets

HIGH-RESOLUTION LIGHT-FIELD PROJECTOR

RELATED APPLICATION

This application is a national phase application of PCT/IB2020/061091. filed on November 24. 2020. The entire contents of this application is hereby incorporated by reference.

Technical Domain

The present disclosure relates to displays, more particularly to a light-field projector for projecting an image, such as 3D displays providing correct monocular depth cues. In particular, the present disclosure relates to near-eye light-field projector for virtual and augmented reality goggles and glasses, and virtual and augmented reality applications.

RELATED ART

Today's light-field displays use, among other concepts, sequential projection of a set of "always-in-focus" images through a set of spatially disparate virtual pinholes. This approach does not allow to reconstruct the wavefront of a virtual pixel because the image components are projected in a time sequence while the wavefront reconstruction requires interference and therefore coincidence of wave front components. Consequently, the perceived resolution is limited by the resolution or individual light-field components delivered to the imaging sensor, e.g. into an eye. The resolution is determined by the effective numerical aperture of the pinhole and by the difference between the focal plane of the image of the image source, i.e. the plane of the image pixels, and the plane where the imaging optics-usually a human eye-is focused. Hence, the expression "always in focus" is approximative as the optical path of light-field components have always finite aperture which, when it is large, carries finite depth of field of the imagery, or, when it is small, it reduces the resolution of the image source due to diffraction on an aperture.

The same problem is present in light-field systems based on emissive displays and lens arrays. The individual pixels are decoupled and do not provide mutually coherent beams with mutually coupled phases which does not allow their interference while the finite aperture of the lenses in the lens arrays controls the resolution and depth of field of individual light-field components.

Light-field imagery is typically constructed by a plurality of images that are projected through spatially disparate pupils in the optical path. It is achieved in various ways including sequential light-field projection or by splitting and collimating light beams from an emissive display by a lens array.

These optical systems are apparently displaying virtual pixels in a different focal plane than that of the flat image source itself. The element which allows to promote the apparent focusing on a virtual pixel over real pixels on the image source is the content itself together with the large depth of field of each light-field component that is secured by a small pupil through which each light-field component is passing compared to the combined aperture of all individual spatially disparate sub-pupils. The finite aperture of each sub-pupil, on the other hand, limits the effective resolution of light-field imagery especially in locations far from the focal plane of the image of the image source itself.

SUMMARY

The present disclosure concerns a light-field projector for projecting an image, the light-field projector comprising: an image source comprising an image generating device including a plurality of pixel components generating a plurality of modulated light beams; an imaging optical element collimating the plurality of modulated light beams; projection optics comprising a first projection element configured to project the modulated light beams such as to define an eye-box and to form projector pixel images of the pixel components at a projector image plane between the first projection element and the eye-box, the modulated light beams intersecting at a projector virtual pixel image. The imaging optical element is configured to shift the projector image plane to a shifted plane, between the first projection element and the eye-box where the projector pixel image coincides with the projector virtual pixel image.

Moreover, the image source can be controllable such as to adjust spatial distribution of the pixel components forming the image component to be projected by the light-field projector. The controllable image source allows for the modulated light beams to construct the intended light-field output.

The light-field projector disclosed herein exceeds the effective resolution limits of the known light-field projection systems.

The light-field projector allows the modulated light beams to preserve the qualities for the light-field created by known light-field projection systems, and, moreover, it allows controlling which focal plane coincides with the image plane of the image source, where the image resolution is limited only by the image source resolution and apertures in individual optical paths of each light-field component.

The disclosed light-field projector is more robust than conventional projection systems imitating focal depth purely by dynamic adaptation of focal distance of a flat image achieved by the action of varifocal elements based on eye-tracking information. These conventional systems do not generate a viewer-independent light-field, but mimic what an eye should see depending on its actual focus.

In the invention disclosed here, the viewer-independent light-field feature is present at all times and provides correct accommodation cues without any additional action. The varifocal mechanism in the disclosed light-field projector allows on-demand promotion of resolution at desired focal plane in the light-field scene.

The light-field projector can be used for near-eye light-field displays for virtual and augmented reality goggles and glasses, and virtual and augmented reality applications.

SHORT DESCRIPTION OF THE DRAWINGS

Exemplar embodiments of the invention are disclosed in the description and illustrated by the drawings in which.

Figure 3A:
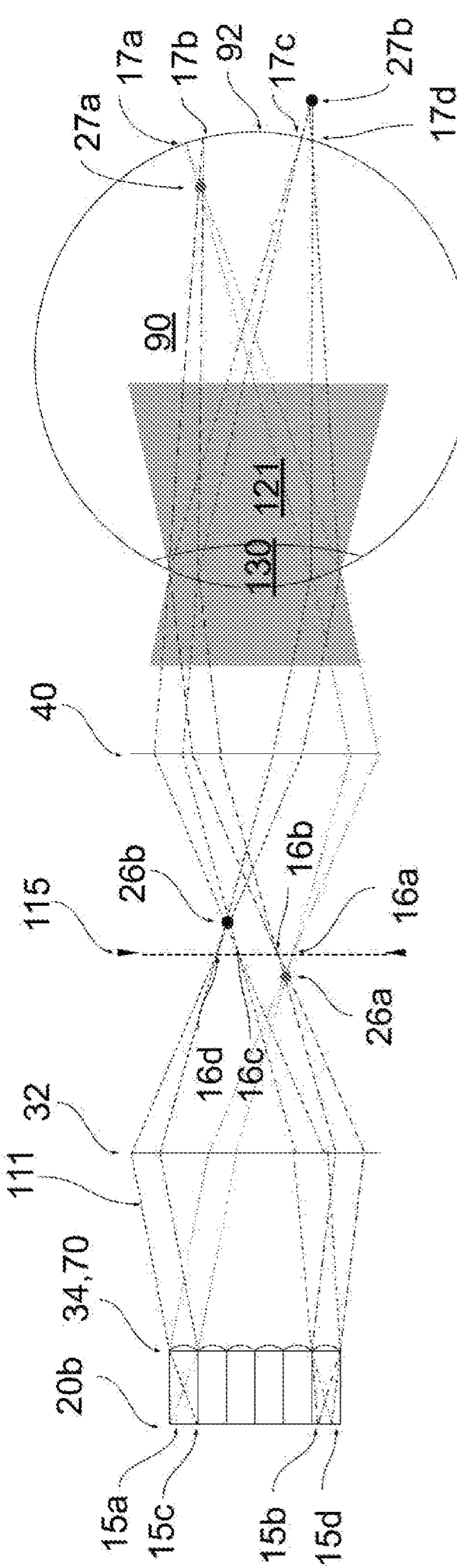
Figure 3B:
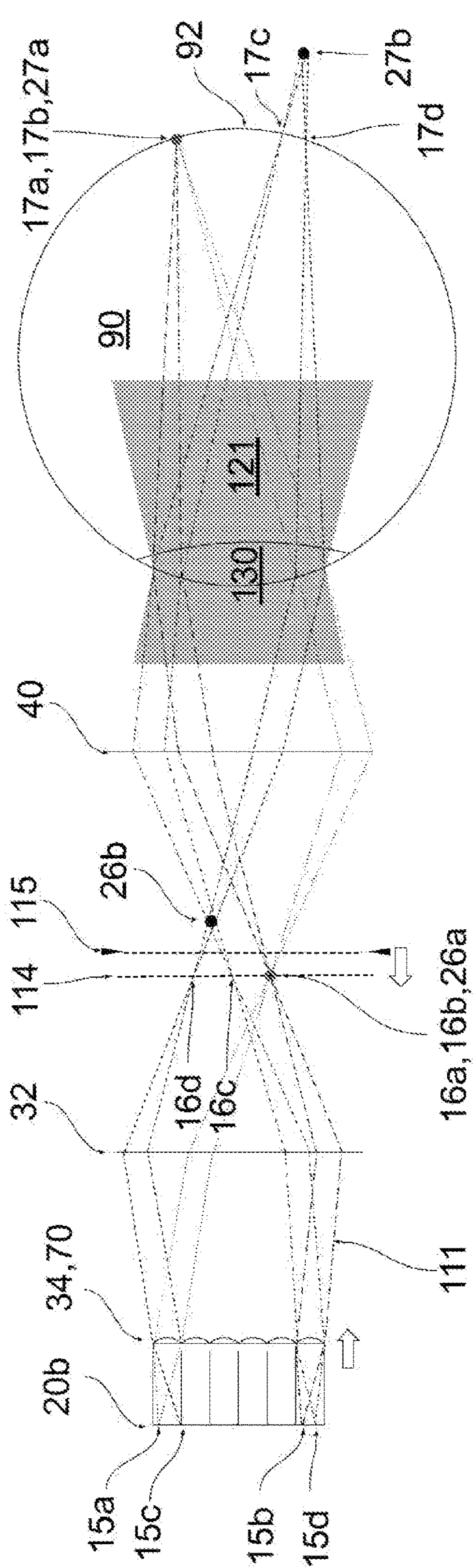
Figure 3C:
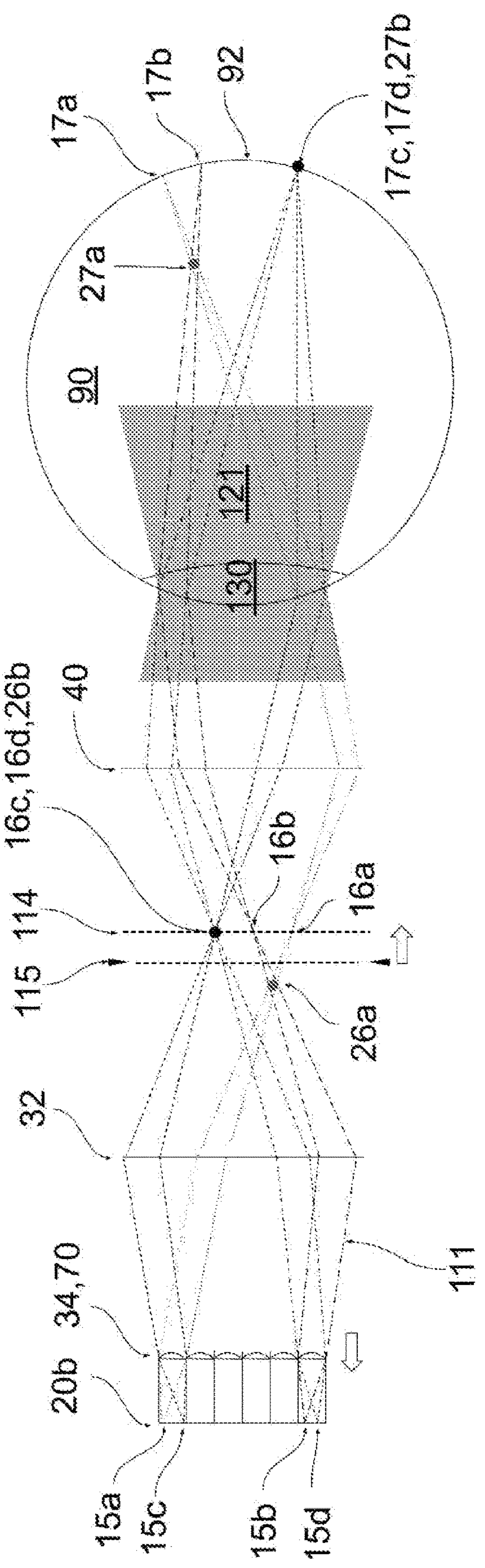
Figure 4:
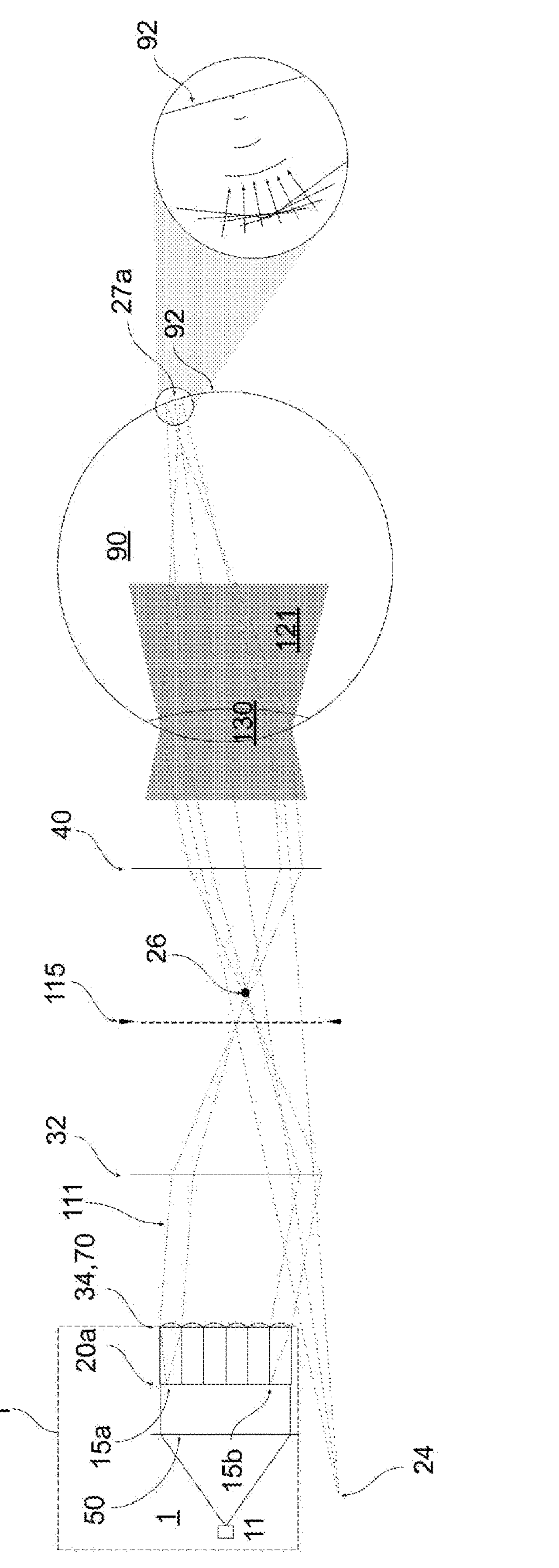

FIG. 3*a* illustrates the light-field projector wherein the light-field image source comprises an emissive display;

FIG. 3*b* illustrates the light-field projector of FIG. 3*a* comprising the imaging optical element according to an embodiment;

FIG. 3c illustrates the light-field projector of FIG. 3a comprising the imaging optical element according to another embodiment; and FIG. 4 shows the light-field projector where the light-field image source comprises a coherent light-source illuminating a reflective or transmissive and diffractive display, according to an embodiment.

Examples of Embodiments

Figure 1:
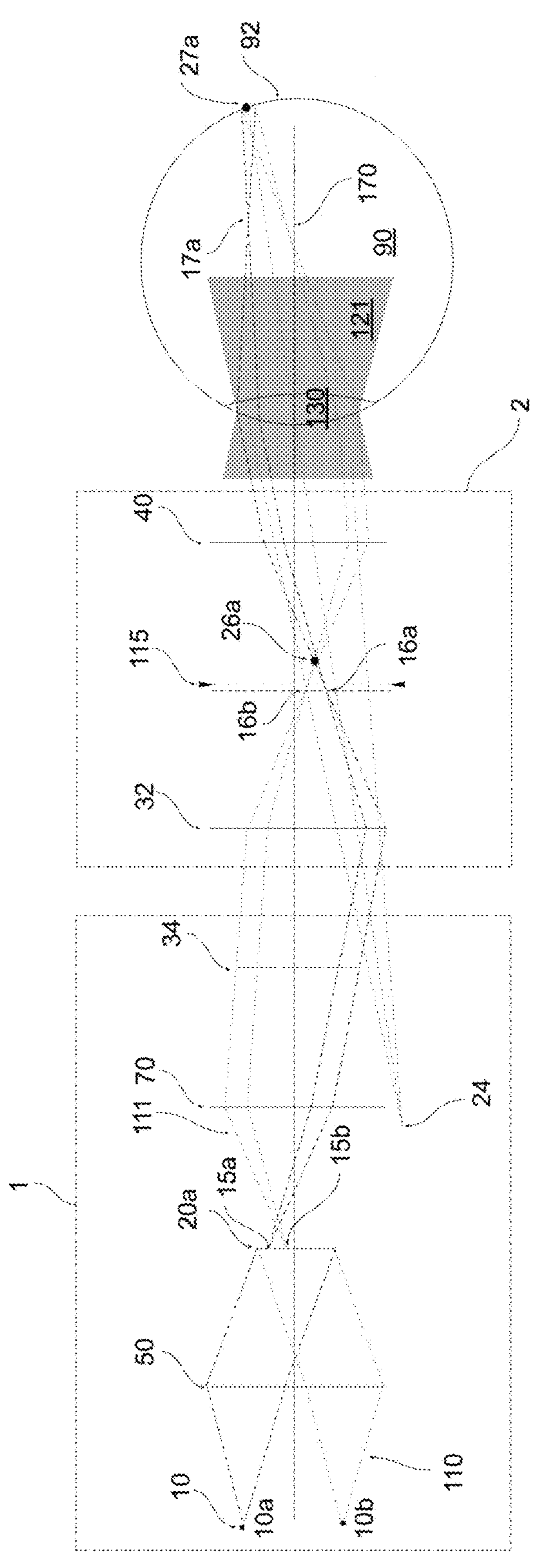
FIG. 1 shows a light-field projector comprising a light-field image source, an imaging optical element and projection optics.

FIG. 1 shows a light-field projector comprising an image source 1. The image source comprises a light-source 10 comprising an array of time-sequentially activatable point-lights (also called pin-lights), each point-light generating a light beam 110. In FIG. 1, two point-lights 10a and 10b are shown. The light-field projector further comprises a spatial light modulator (SLM) 20a comprising a plurality of pixel components 15a, 15b, each modulating a light beam component 111 reflected and diffracted on the pixels such as 15a and 15b.

In the example of FIG. 1, pixel component 15a is active for point-light 10a, and pixel component 15b is active for point-light 10b. In practice however, the light-source 10 can comprise any number, for example tens or hundreds of spatially disparate point-lights 10a, 10b that are illuminated in a time-sequence. The spatial disparity can be only apparent, generated by a single light-source or smaller array of light-sources that is multiplicated by another active element, such as a beam steering mirror or a phase spatial light-modulator. The function of the light-source array can be also substituted by an active phase array. The SLM 20a can comprise complex image patterns having thousands or millions of active pixel components 15a, 15b.

The image source 1 further comprises an imaging optical element 70 projecting an image of the light source 10 to a light-source image plane 34 of the pin-light source. The imaging optical element 70 can further collimate the modulated light beams 111.

The light-field image source 1 can further comprise a collimating element 50 collimating the light beams 110 on the SLM 20a. Here, the combination of the collimating and imaging optical elements 50, 70 projects the image of the light source 10 to a light-source image plane 34 of the pin-light source.

In one aspect, the light-source image plane 34 can comprise a passive or active Fourier filter. The Fourier filter can be formed from an array of pin-holes or an array of optical shutters. The array of optical shutters may comprise a fast modulator such as DMD, FLCOS, a phase change material shutter, or any other device acting as optical shutters. The light-source image plane 34 can be considered as the entrance pupil where a fully constructed light-field enters a projection optics.

The light-field projector further comprises projection optics 2 configured to project the modulated light beams 111 such as to define an eye-box 121. The eye-box 121 can be defined along a projection axis 170 of the light-field projector, but more generally, the eye-box 121 is defined in the direction of the projected modulated light beams 111. More particularly, projection optics 2 can comprise a first projection element 32 configured to project the modulated light beams 111 such as to form a projector image plane 115, and such as to form projector pixel images 16a, 16b of the pixel components 15a and 15b, respectively, in the projector image plane 115. FIG. 1 shows two projector pixel images 16a and 16b of the pixel components 15a, 15b, respectively.

Projection optics 2 can further comprise a second projection element 40 configured to project the image of the projector image plane 115, to any chosen location in the direction of the projected modulated light beams 111. The second projection element 40 can comprise an eye-piece or a combiner. In the example of FIG. 1, the image of the projector image plane 115 is located at a "neutral" position such that an eye-box projector image, i.e. the image of the pixel components 15a, 15b as seen from the eye-box 121, is at infinity. In FIG. 1, the eye-box projector image is not shown but its position at infinity is indicated by the collimated modulated light beams 111.

In FIG. 1, the two exemplary modulated light beams 111 from the pixel 15a and 15b intersect at a projector virtual pixel image 26a that differs from the projector image plane 115. The projector virtual pixel image 26a corresponds to an image of a virtual pixel in the light-field projector before the second projection element 40. Consequently, an eye-box virtual pixel image 24 is formed by the apparent intersection of the pixel beams as seen from the eye-box 121. The eye-box virtual pixel image 24 is located at a different distance than the eye-box projector image plane (not shown) which is in infinity in this example.

The light-field projector can be configured to project images to an imaging optic device, such as a camera or the eye 90 of a viewer as shown in FIG. 1. The exit pupil of the light-field projector may coincide with an entrance pupil of the imaging optic device, for example with the eye pupil 130 of a viewer's eye 90.

When the light-field projector projects images towards the eye 90 of a viewer, the lens 130 of the eye 90 is focused on the location of the eye-box virtual pixel image 24. Thus, the lens 130 projects the modulated light beams 111 at the same location, here a sensor virtual pixel image 27a near the eye's retina 92. Note that the light-field projector may as well project images towards a camera. A lens of the camera would then project the modulated light beams 111 at a sensor virtual pixel image 27a near a camera's sensor.

Sensor pixel images 17a, 17b of the pixel components 15 are formed before the retina 92 (or sensor) at a different distance than the sensor virtual pixel image 27a. The sensor pixel images 17a, 17b correspond to a second image of, respectively, the pixel component 15a and 15b in the viewer's eye 90 or in an imaging optic device.

In some aspects, the light-field projector may also be configured to project a content or react to content-related instructions in order to promote the resolution of virtual objects of interest, for instance of a virtual text at a certain distance.

Figure 2:
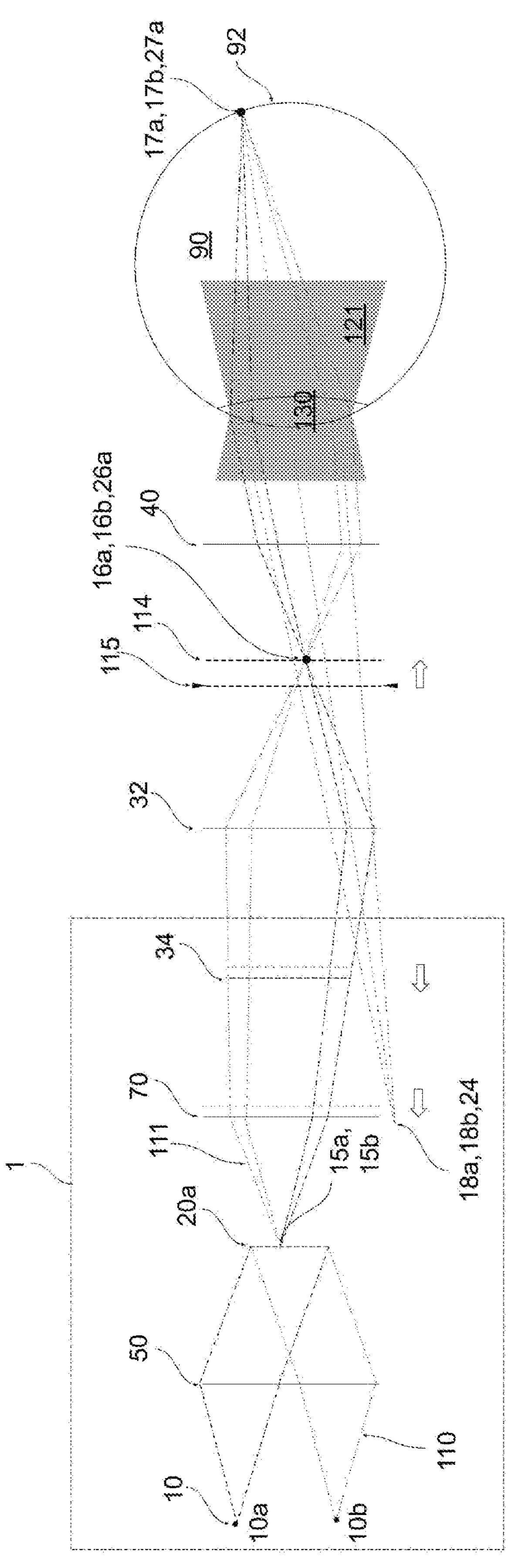
FIG. 2 illustrates the light-field projector comprising the imaging optical element according to an embodiment and wherein the light-field image source comprises an array of time-sequentially activatable point-lights.

FIG. 2 illustrates a light-field projector, according to an embodiment, wherein the imaging optical element 70 is configured to move the position of the projector image plane 115 such that the position of the projector image plane 115 can coincide with the position of the projector pixel image 16a, 16b.

In the example of FIG. 2, the imaging optical element 70 comprises a lens that is movable. In the present embodiment, the lens 70 is moved towards the SLM 20a. In comparison with FIG. 1, the projector image plane 115 is shifted to a shifted plane 114 where the projector pixel image 16a, 16b coincides with the projector virtual pixel image 26a. In other words, the projector pixel image 16a, 16b is located where the modulated light beams 111 from the pixel 15a and 15b intersect.

Other configurations of the imaging optical element 70 allowing to move the position of the projector image plane 115 to the shifted plane 114 are possible. For example, the imaging optical element 70 can comprise an optical element having a variable focal length, such as an optical element comprising an element with variable geometry, a medium whose refractive index is variable, an electro-optic material, a birefringent element with polarization rotating element such as a liquid crystal or other elements doing the same.

Moreover, the SLM 20*a* can be controlled such as to adjust the spatial distribution of the pixel components 15*a*, 5*b* forming the image component to be projected by the light-field projector. As can be seen in FIG. 2, the pixel components 15*a* and 15*b* are distributed differently (closer) in the SLM 20*a* compared to the configuration of FIG. 1. The adjustment of the active pixel components 15*a*, 15*b* forming the image component allows constructing the intended light-field output and the coincidence of the projector pixel image 16*a*, 16*b* with the projector virtual pixel image 26*a*.

As shown in FIG. 2, the eye-box virtual pixel image 24 is formed by the apparent intersection of the modulated light beams 111 as seen from the eye-box 121. The location of the eye-box virtual pixel image 24 coincides with that of the eye-box projector images 18*a*, 18*b*.

When the light-field projector projects images towards a viewer eye 90, the lens 130 of the eye 90 is focused on the location of the eye-box virtual pixel image 24. The lens 130 projects the modulated light beams 111 at the same location, here a sensor virtual pixel image 27*a* near the eye's retina 92. Sensor pixel images 17*a*, 17*b* of the pixel components 15 are also formed near the eye's retina 92 and coincide with the sensor virtual pixel image 27*a*.

The perceived resolution of the virtual imagery in the focal distance of interest, i.e. in the distance of the eye-box virtual pixel image 24 is essentially limited only by the resolution of the image source on the SLM 20*a*.

In one aspect, the light-source image plane 34 can comprise a Fourier filter especially when a highly diffractive SLM 20*a* is used. Here, the light-source image plane 34 can be shifted along the projection axis 170, towards the SLM 20*a*, in order to make the position of the projector image plane 115 coincide with the position of the projector pixel image 16*a*, 16*b*.

FIG. 3*a* shows the light-field projector, according to another embodiment wherein the image source 1 comprises an emissive display 20*b*. Here, the light-field projector is based on decomposition of an emissive display into modulated light beams 111 with collimated pixel beams by a lens array. The emissive display 20*b* can comprise a liquid crystal display (LCD), organic light-emitting diode (OLED), microLED, or other suitable displays. The pixel components 15*a*, 15*b* of a virtual pixel 24 are directly emitted by the emissive display 20*b* and are collimated by the imaging optical element 70 located in the light-source image plane 34 or entrance pupil. Here, the imaging optical element 70 comprises an array of collimating optical elements, such as an array of lenses. The imaging optical element 70 can further act as a Fourier filter and determine the pinhole apertures corresponding to the individual modulated light beams 111 for each pixel components 15*a*, 15*b*.

Similarly to the light-field projector configuration of FIGS. 1 and 2, projection optics 2 can comprise the first projection element 32 and the second projection element 40.

In FIG. 3*a*, the lens 130 of the viewer's eye 90 is focused on the projector image plane 115 in a neutral position, such that the position of an eye-box projector image, the image of the pixel components 15*a*, 15*b* as seen from the eye-box 121, is at infinity. The eye-box projector image (the image of the projector SLM plane) is not shown in FIG. 3*a* but its position at infinity is indicated by the collimated modulated light beams 111 entering the eye-box 121.

The projector virtual pixel image 26*a* and the sensor virtual pixel image 27*a* correspond to the intersection of the modulated light beams 111 from the pixel 15*a* and 15*b*, and the projector virtual pixel image 26*b* and sensor virtual pixel image 27*b* correspond to the intersection of the modulated light beams 111 from the pixel 15*c* and 15*d*. The projector pixel images 16*a*, 16*b*, 16*c* and 16*d* correspond to the images (focal points) of the modulated light beams 111 in the projector image plane 115 from the pixel 15*a*, 15*b*, 15*c* and 15*d*, respectively. The sensor pixel images 17*a*, 17*b*, 17*c* and 17*d* correspond to the a second image of, respectively, the pixel component 15*a*, 15*b*, 15*c* and 15*d*, respectively, in the viewer's eye 90 or in an imaging optic device.

In the configuration of FIG. 3*a*, none of the projector virtual pixel images 26*a*, 26*b* coincides with the projector pixel images 16*a*, 16*b*, 16*c* and 16*c*, and none of the sensor virtual pixel images 27*a*, 27*b* coincides with the sensor pixel images 17*a*, 17*b*, 17*c* and 17*d*.

FIG. 3*b* illustrates the light-field projector of FIG. 3*a* wherein the imaging optical element 70 has been shifted from its "neutral" position shown in FIG. 3*a* towards the emissive display 20*b* to a position such as to shift the projector image plane 115 to the shifted plane 114 closer to the emissive display 20*b*. Moreover, the emissive display 20*b* is controlled such as to adjust the active pixel components 15 forming the image component to be projected by the light-field projector. As can be seen in FIG. 3*b*, the pixel components 15*a* and 15*b* are distributed differently (closer from each other) in the emissive display 20*b* compared to the pixel components 15*c* and 15*d*.

As a result, the projector pixel images 16*a*, 16*b* coincide with the projector virtual pixel image 26*a*. When the light-field projector cooperates with a viewer the eye 90, the lens 130 projects the modulated light beams 111 at the sensor virtual pixel image 27*a* near the eye's retina 92 and the sensor pixel images 17*a*, 17*b* are formed near the eye's retina 92 and coincide with the sensor virtual pixel image 27*a*.

Since the pixel components 15*c* and 15*d* are not adjusted in the emissive display 20*b*, the projector pixel images 16*c*, 16*d* do not coincide with the projector virtual pixel image 26*a* and the sensor pixel images 17*a*, 17*b* do not coincide with the sensor virtual pixel image 27*b*.

Again, the imaging optical element 70 can comprise a varifocal optical element configured to move the position of the projector image plane 115 such that the position of the projector image plane 115 can coincide with the position of the projector pixel image 16*a*, 16*b*.

FIG. 3*c* shows the light-field projector from FIG. 3*a* wherein the imaging optical element 70 has been shifted from its "neutral" position shown in FIG. 3*a* closer to the emissive display 20*b* to a position such as to shift the projector image plane 115 to the shifted plane 114 farther from the emissive display 20*b*. Moreover, the emissive display 20*b* is controlled such as to adjust the active pixel components 15*a*-15*d* forming the image component to be projected by the light-field projector. As can be seen in FIG. 3*b*, the pixel components 15*c* and 15*d* are distributed differently (spaced farther apart) in the emissive display 20*b* compared to the pixel components 15*a* and 15*b*.

As a result, the projector pixel images 16*a*, 16*b* coincide with the projector virtual pixel image 26*a*. When the light-field projector projects images towards a viewer's eye 90, the lens 130 projects the modulated light beams 111 at the sensor virtual pixel image 27*a* near the eye's retina 92 and the sensor pixel images 17*c*, 17*d* are formed near the eye's retina 92 and coincide with the sensor virtual pixel image 27*b*. Since the pixel components 15*a* and 15*b* are not adjusted in the emissive display 20*b*, the projector pixel images 16*a*, 16*b* do not coincide with the projector virtual pixel image 26*a* and the sensor pixel images 17*a*, 17*b* do not coincide with the sensor virtual pixel image 27*a*.

FIG. 4 shows the light-field projector according to another embodiment where the image source 1 comprises a coherent monochromatic light-source 11 projecting mutually coherent light beams illuminating a transmissive or reflective and diffractive display 20*b*, such as in the configurations of FIGS. 3*a* and 3*b*. In the implementation FIG. 4, the light-field projector functions as a wavefront shaping projection system.

For instance, the coherent monochromatic light-source 11 can comprise a laser. The display 20*b* can be transmissive or reflective modulating amplitude and possibly phase of the incident light. The display 20*b* acts as an SLM and diffracts the light beam of the coherent light-source 11 at each pixel and widens the light beam before each of the lenses of the lens array at the light-source image plane 34. The light beam of the coherent light-source 11 can be optionally collimated by a collimating element 50 and modulated at the display 20*b* acting as an SLM.

The imaging optical element 70 comprises an array of collimating optical elements, such as an array of lenses. The imaging optical element 70 can further act as a Fourier filter and determine the pinhole apertures corresponding to the individual light-field component images for each pixel components 15*a*, 15*b*. The Fourier filtering is however not needed in this embodiment.

The modulated light beams 111 exiting the image source 1 through the different lenses of the imaging optical element 70, and possibly the light-source image plane 34, are mutually coherent. The modulated light beams 111 are thus able to interfere at the points of their incidence where they construct a wavefront composed of multiple wavefront components. It is then possible to reconstruct a wavefront of an arbitrary virtual pixel when the light-field components coincide in the vicinity or exactly at the sensor of an imaging optic device, for example the retina 92 of an eye 90.

The wavefront construction is illustrated in the zoomed-in part of FIG. 4, where arrows represent the wave vectors and lines the wavefronts of individual light-field components. The plane waves are considered only for illustration. In reality, each component is approximately spherical with mutually disparate origins. The coherent light-field components construct a spherical wave which has an apparent origin in a virtual point source, representing the virtual pixel.

Reference Numbers and Symbols

1 image source
2 light-field projection optics
10 light source
10*a*, 10*b* point-light
11 coherent monochromatic light-source
15*a*-15*d* pixel component
16*a*-16*d* projector pixel image
17*a*-17*d* sensor pixel image
18*a*, 18*b* eye-box projector image
20*a* spatial light modulator
20*b* display
24 eye-box virtual pixel image
26*a* projector virtual pixel image
26*b* projector virtual pixel image
27*a* sensor virtual pixel image
27*b* sensor virtual pixel image
32 first projection element, lens
34 light-source image plane, Fourier filter
40 second projection element
50 collimating element
70 imaging optical element
90 imaging optic device, eye
92 sensor, retina
110 light beam
111 modulated light beam
114 shifted plane
115 projector image plane
121 eye-box
130 eye pupil, lens

The invention claimed is:

1. Light-field projector for projecting an image, the light-field projector comprising:

an image source comprising a light-source including a plurality of pixel components generating a plurality of modulated light beams and an imaging optical element configured to project an image of the light source to a light-source image plane and to collimate said plurality of modulated light beams; and projection optics comprising a first projection element configured to project the modulated light beams to define an eye-box and to form projector pixel images for each pixel component of said plurality of pixel components at a projector image plane between the first projection element and the eye-box, the modulated light beams generated from the different pixels components of said plurality of pixel components intersecting at a projector virtual pixel image between the first projection element and the eye-box;

wherein the imaging optical element is further configured to shift the projector image plane from a position where the projector image plane differs from the projector virtual pixel image to a shifted plane, between the first projection element and the eye-box, where the projector pixel image coincides with the projector virtual pixel image.

2. The light-field projector according to claim 1, wherein the imaging optical element comprises a lens that is movable.

3. The light-field projector according to claim 1, wherein the imaging optical element comprises an optical element having a variable focal length.

4. The light-field projector according to claim 1, wherein the image source is controlled to adjust spatial distribution of the pixel components forming the image component to be projected by the light-field projector.

5. The light-field projector according to claim 1, wherein the light-source includes an array of time-sequentially activatable point-lights, each point-light generating a light; and wherein the light-field projector further comprises a spatial light modulator (SLM) comprising said plurality of pixel components.

6. The light-field projector according to claim 1, wherein the image source comprises an emissive display comprising said plurality of pixel components.

7. The light-field projector according to claim 6, wherein the emissive display comprises a liquid crystal display (LCD), organic light-emitting diode (OLED) or a microLED.

8. The light-field projector according to claim 6, wherein the light-source comprises a coherent light-source projecting mutually coherent light beams at the emissive display.

9. The light-field projector according to claim 8, wherein the emissive display is configured to diffract and widens the modulated light beams at each of said plurality of pixel components at the emissive display.

10. The light-field projector according to claim 6, wherein the imaging optical element comprises an array of collimating optical elements located in the light-source image plane.

11. The light-field projector according to claim 1, wherein the projection optics comprises an optical combiner projecting the modulated light beams from the projector image plane to form sensor pixel images; and wherein the imaging optical element shifts the projector image plane in a position where the sensor pixel images coincide with a sensor virtual pixel image.

12. The light-field projector according to claim 1, wherein the modulated light beams generated by the display are mutually coherent and are configured to construct a wavefront composed of multiple wavefront components at the sensor virtual pixel image.

13. The light-field projector according to claim 1, wherein the light-source image plane comprises a Fourier filter.

14. The light-field projector according to claim 1, configured to project images to an imaging optic device comprising a sensor; and wherein sensor pixel images of the pixel components are formed substantially at the sensor and coincide with the sensor virtual pixel image.

15. The light-field projector according to claim 1, wherein the light-field projector is configured to project a content or react to content-related instructions.

* * * * *